(12) United States Patent
Chen et al.

(10) Patent No.: US 7,168,945 B2
(45) Date of Patent: Jan. 30, 2007

(54) INJECTION MOLD WITH ACCESSORIAL EJECTING MECHANISM

(75) Inventors: Chihyu Chen, Tucheng (TW); Lobo Wang, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 224 days.

(21) Appl. No.: 11/014,995

(22) Filed: Dec. 20, 2004

(65) Prior Publication Data

US 2006/0134260 A1 Jun. 22, 2006

(51) Int. Cl.
*B29C 45/40* (2006.01)
(52) U.S. Cl. .................. 425/577; 425/438; 425/441; 425/443; 425/436 RM; 425/556
(58) Field of Classification Search .............. 425/438, 425/441, 443, 436 RM, 556, 577
See application file for complete search history.

(56) References Cited

U.S. PATENT DOCUMENTS 3,197,825 A * 8/1965 Hammond .................. 164/345
4,157,888 A * 6/1979 Sikorski ..................... 425/556
4,306,851 A * 12/1981 Thune ........................ 425/468
5,112,207 A * 5/1992 Pinsonneault ........... 425/192 R
5,538,413 A * 7/1996 Gardner et al. ............. 425/145
5,670,184 A * 9/1997 Nakamichi et al. ......... 425/130
2006/0034974 A1* 2/2006 Hashimoto et al. ......... 425/556

* cited by examiner

*Primary Examiner*—Joseph S. Del Sole
*Assistant Examiner*—Emmanuel S. Luk
(74) *Attorney, Agent, or Firm*—Rosenberg, Klein & Lee

(57) ABSTRACT

The present invention provides an accessorial ejecting mechanism mounted beneath a male mold section. The accessorial ejecting mechanism includes an accessorial plate, a rail, a slider, and a movable board. The accessorial plate secured to the male mold section has a recess in the top surface thereof. The rail is received in the recess and fixed to the accessorial plate. The slider, connecting a driving device, is slidable along the rail. The slider defines at least a guiding groove whose opposite ends are in different height. The movable board is also received in the recess. At least a guiding post is fixed to a side of the movable board and extends outwardly into the guiding groove. Sliding of the slider makes the movable board move up and down. Pin cores for forming pinholes of a molded article are fixed to the movable board so as to move up and down together with the movable board.

2 Claims, 7 Drawing Sheets

INJECTION MOLD WITH ACCESSORIAL EJECTING MECHANISM

BACKGROUND OF THE INVENTION

1. Field of the Invention

The present invention generally relates to an injection mold, and more particularly to an injection mold with accessorial ejecting mechanism which ensures a molded article be stripped therefrom swimmingly and smoothly.

2. The Related Art

As shown in FIG. 7, injection mold typically comprises an upper retaining plate 101, a stripper 102, a female mold section 103, a male mold section 104, a frame 105, an upper ejector plate 106, a lower ejector plate 107, and a lower retaining plate 108. The female and the male mold sections 103, 104 define a mold cavity 109 therebetween into which molten plastic is injected to form a molded article. Ejector rods 110 are fixed to the upper and the lower ejector plates 106, 107. Each ejector rod 110 extends through a corresponding ejector hole 111 in the male mold section 104 to meet the mold cavity 109. The upper and the lower ejector plates 106, 107 and the ejector rods 110 together constitute a mold-ejecting mechanism that may move up and down for removing the molded article after injection molding. During each molding cycle, after the injection mold being opened, the mold-ejecting mechanism moves upward and the ejector rods 110 strip the molded article off the male mold section 104.

When to form a molded article as shown in FIG. 6 in which pinholes are densely arranged, a large amount of pin cores are arranged in the male mold section and extends into the mold cavity to form the pinholes. After injection molding, the molded article is adhered to the pin cores and the adhering force is quite large, so that it is difficult for the traditional mold-ejecting mechanism to strip off the molded article. If merely increasing the ejecting force, the molded article may be damaged. In addition, as the molded article can not be arranged ejector rods at the place where pinholes are concentratively arranged, the ejecting of the molded article may be imbalanced, which also tends to damage the article.

SUMMARY OF THE INVENTION

An object of the present invention is to provide an injection mold with accessorial ejecting mechanism which removes the pin cores from the molded article in advance of the molded article being stripped off the male mold section to ensure the molded article be ejected swimmingly and smoothly.

The injection mold in accordance with the present invention is to provide an accessorial ejecting mechanism mounted beneath the male mold section. The accessorial ejecting mechanism comprises an accessorial plate, a rail, a slider, and a movable board. The accessorial plate is fixed to the male mold section and has a recess in the top surface thereof. The rail is received in the recess and fixed to the accessorial plate. The slider, connecting a driving device, is slidable along the rail. The slider defines at least a guiding groove whose opposite ends are in different height. The movable board is also received in the recess. At least a guiding post is fixed to a side of the movable board and extends outwardly into the guiding groove. Pin cores for forming pinholes of a molded article are fixed to the movable board.

Sliding of the slider along the rail brings the guiding post a displacement relative to the guiding groove, that is to say, the guiding post comes from one end of the guiding groove into the other end. As opposite ends of the guiding groove are in different height, the guiding post together with the movable board and the pin cores moves up and down. Therefore the accessorial ejecting mechanism can removes the pin cores from the molded article first, then ejecting mechanism of the injection mold ejects the molded article from the male mold section. Because pre-removing of the pin cores from the molded article can largely reduce the friction of the following ejecting of the molded article, the molded article can be ejected swimmingly and smoothly to avoid being damaged.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMNET

Figure 1:
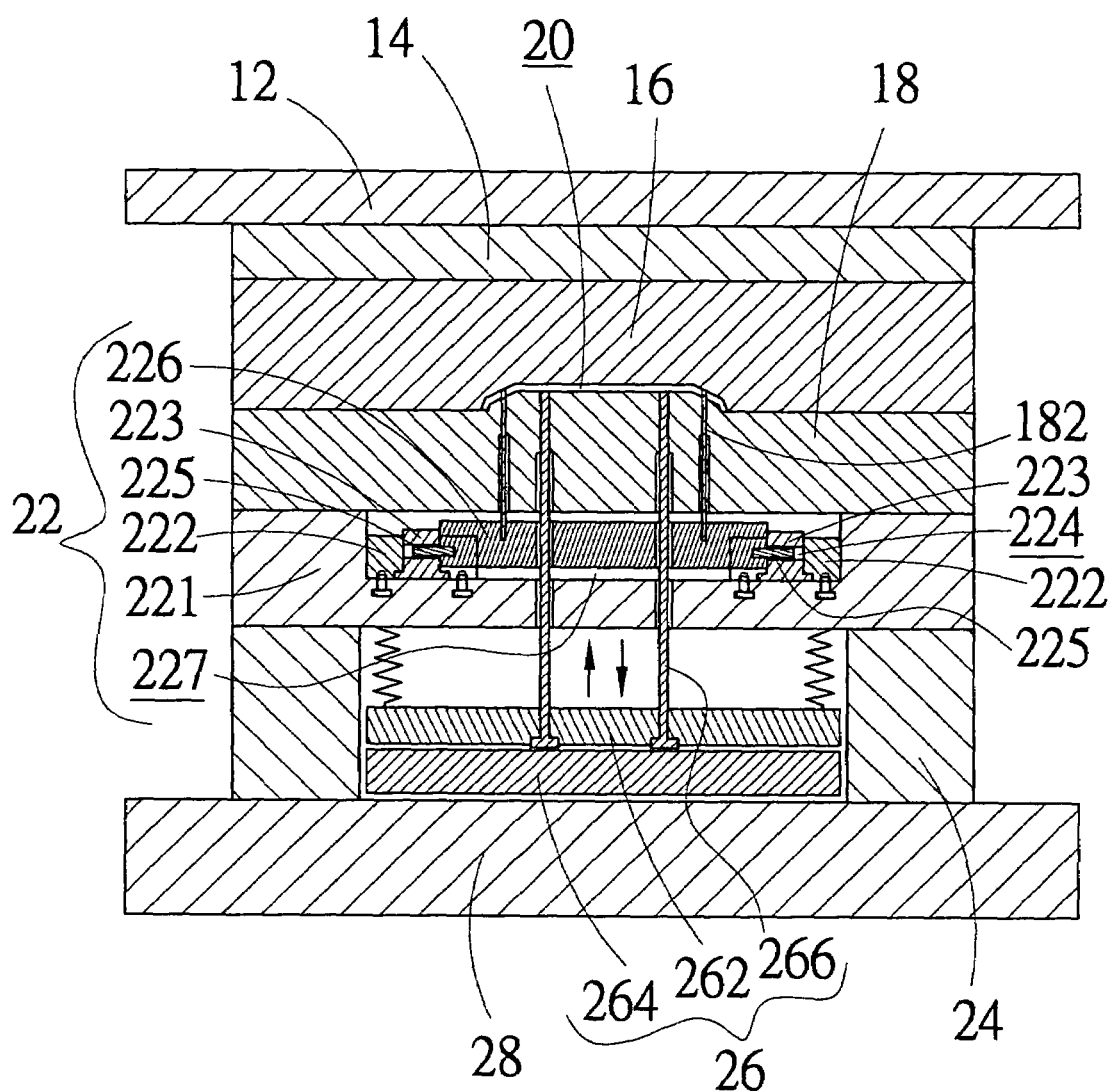
FIG. 1 is an assembled view of an injection mold with accessorial ejecting mechanism in accordance with the present invention.

Referring now to FIG. 1, an injection mold with accessorial ejecting mechanism in accordance with the present invention is shown. The injection mold is applied to form molded articles in which pinholes are densely arranged. The injection mold is composed of an upper retaining plate 12, a stripper 14, a female mold section 16, a male mold section 18, an accessorial ejecting mechanism 22, a frame 24, an ejecting mechanism 26, and a lower retaining plate 28.

The stripper 14 is placed under the upper retaining plate 12 used for stripping off redundant plastic.

The male and the female mold sections 18, 16 define a mold cavity 20 therebetween in the closed position into which molten plastic is injected to form the molded article. The male mold section 18 has a plurality of pin cores 182 extending into the mold cavity 20 to form the pinholes of the molded article.

Figure 2:
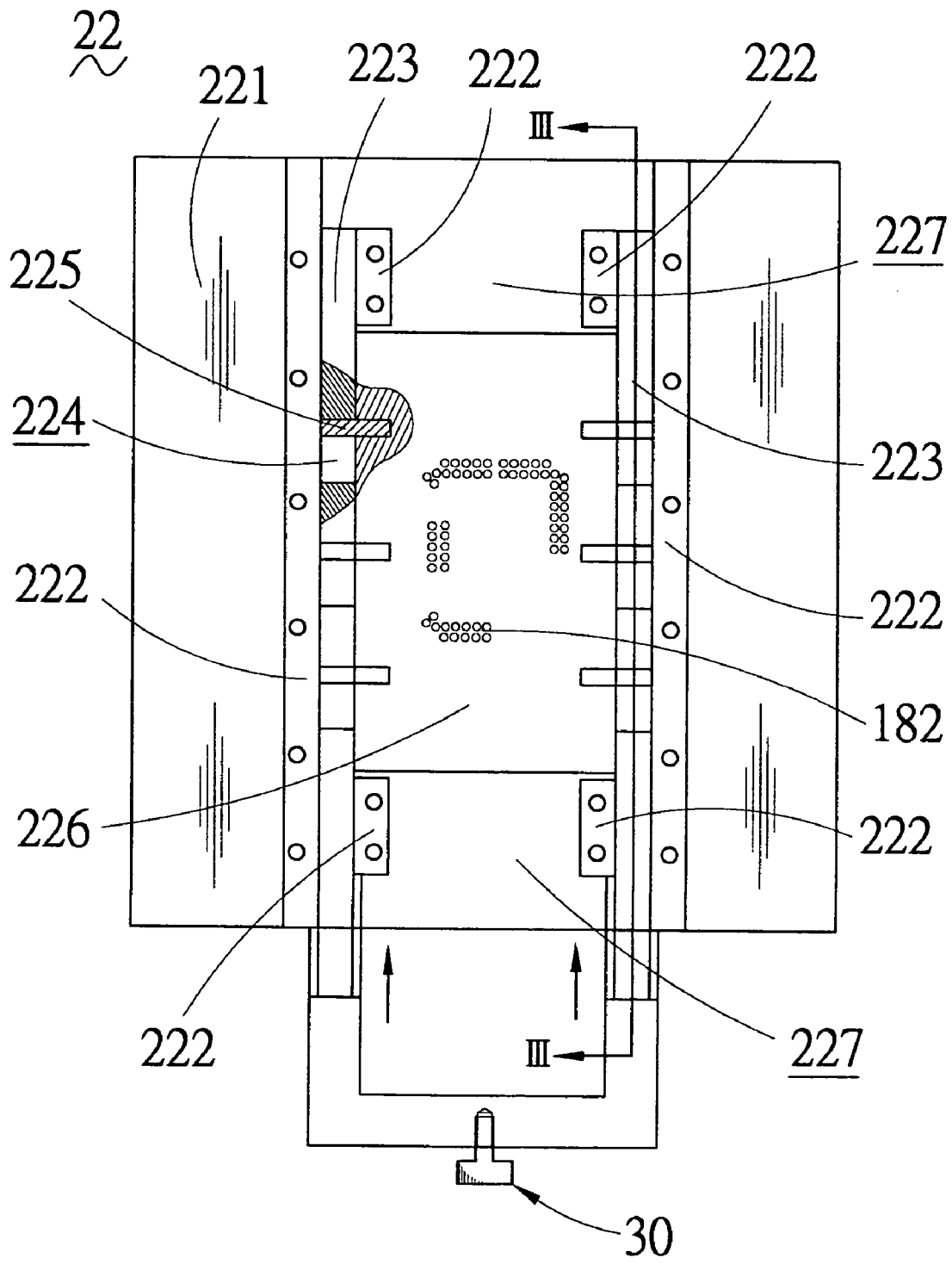
FIG. 2 is a partially cutaway plan view of the accessorial ejecting mechanism in a first state.
Figure 3:
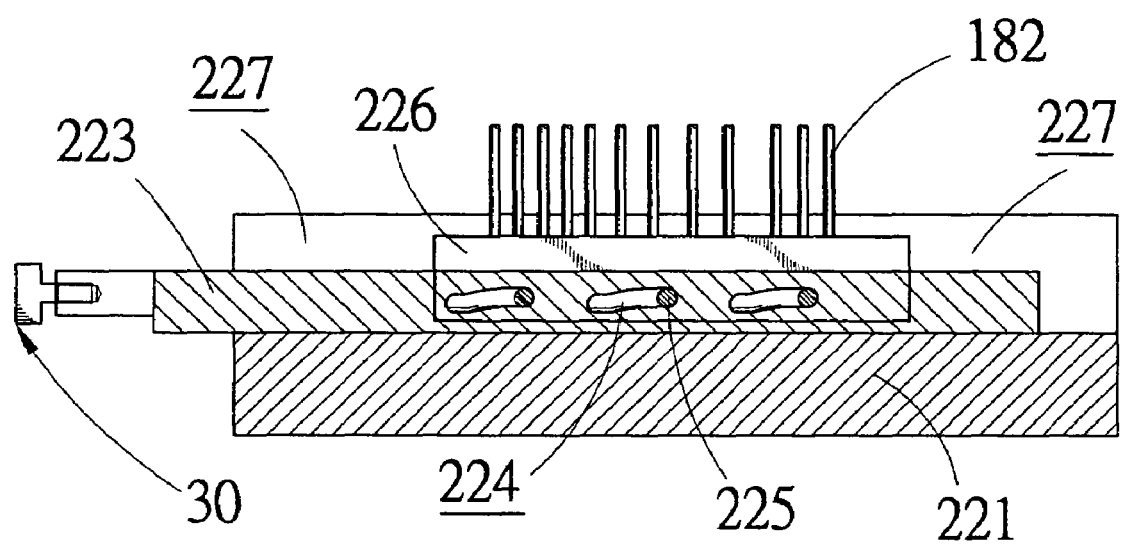
FIG. 3 is a cross section taken along the line III—III of FIG. 2.

With reference to FIGS. 2 and 3, the accessorial ejecting mechanism 22 is mounted beneath the male mold section 18. The accessorial ejecting mechanism 22 comprises an accessorial plate 221, a pair of rails 222, a pair of sliders 223, and a movable board 226. The accessorial plate 221 is fixed to the male mold section 18 and has a recess 227 in the top surface thereof. The pair of rails 222 is arranged in parallel in opposite sides of the recess 227 and is fixed to the accessorial plate 221. The pair of sliders 223, connecting a driver device 30, is slidably engaged with the rails 222. The driver device 30 actuates the pair of sliders 223 to slide along the rails 222. The pair of sliders 223 defines a plurality of guiding grooves 224 in the direction of sliding whose opposite sides are in different height. The height difference between two opposite ends of the guiding grooves 224 at least equals the depth of the pinholes. The movable board 226 is also received in the recess 227 and located between the pair of sliders 223. A plurality of guiding posts 225 are secured to opposite sides of the movable board 226 that face the sliders 223. The guiding posts 225 extend horizontally and outwardly into the corresponding guiding groove 224. The pin cores 182 are fixed on the movable board 226.

The frame 24 is fixed beneath the accessorial plate 221. The lower retaining plate 28 is placed under the frame 24. The ejecting mechanism 26 is positioned in the space surrounded by the frame 24 and the lower retaining plate 28. The ejecting mechanism 26 comprises an upper ejector plate 262, a lower ejector plate 264, and ejector rods 266 secured to the upper and the lower ejector plates 262, 264. The ejector rods 266 extend through the accessorial plate 221, the movable board 226, and the male mold section 18 to meet the mold cavity 20. The ejecting mechanism 26 may be actuated to move up and down so that the molded article can be stripped off the male mold section 18 by the ejector rods 266 after injection molding and mold opening.

Figure 4:
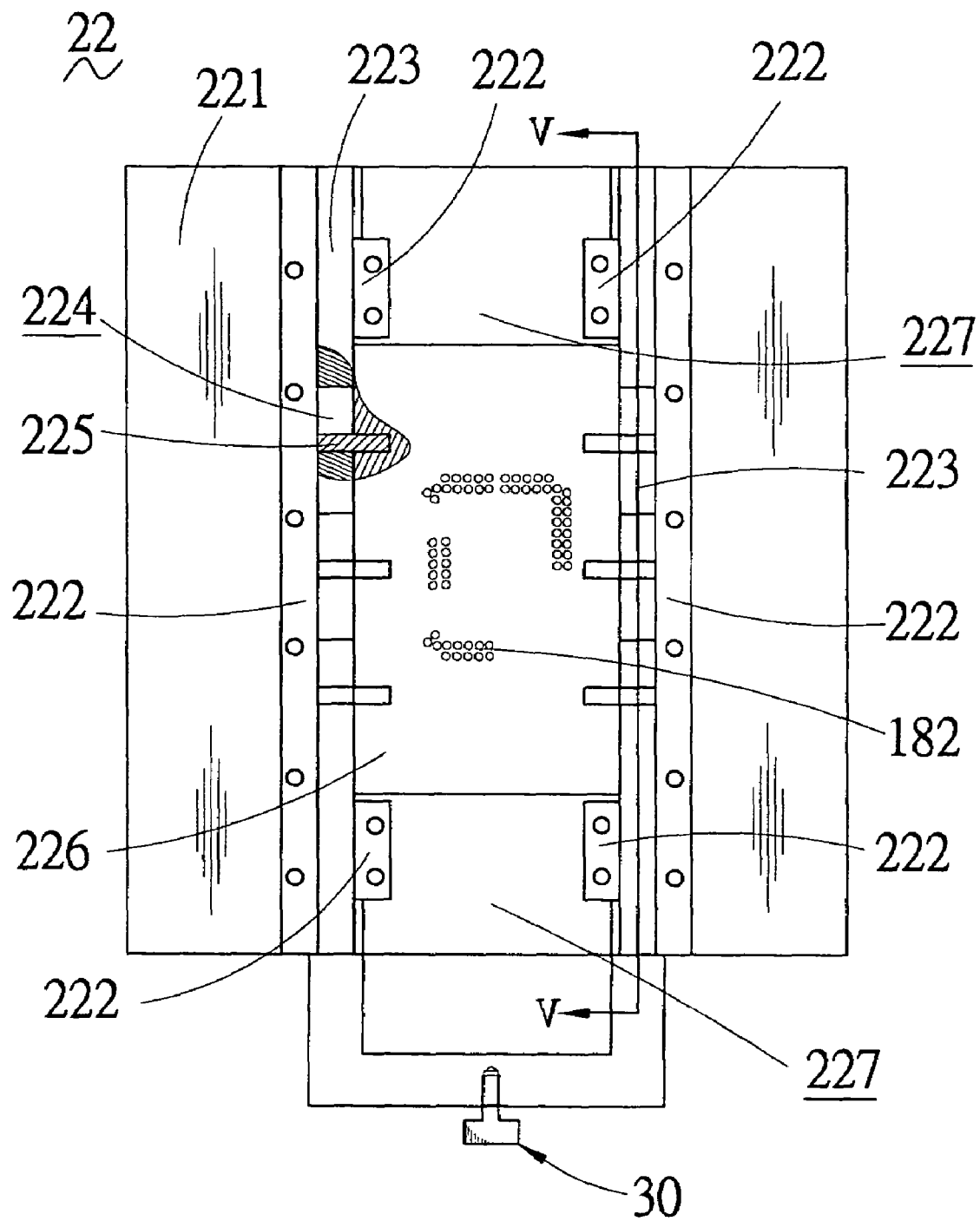
FIG. 4 is a partially cutaway plan view of the accessorial ejecting mechanism in a second state, showing the pin cores being removed from the molded article.
Figure 5:
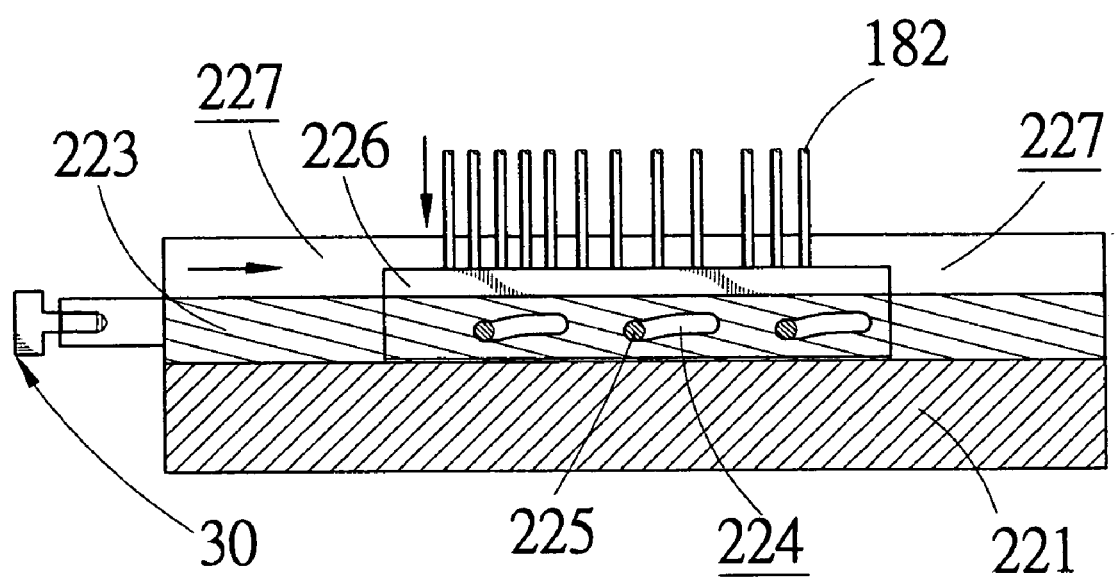
FIG. 5 is a cross section taken along the line V—V of FIG. 4.
Figure 6:
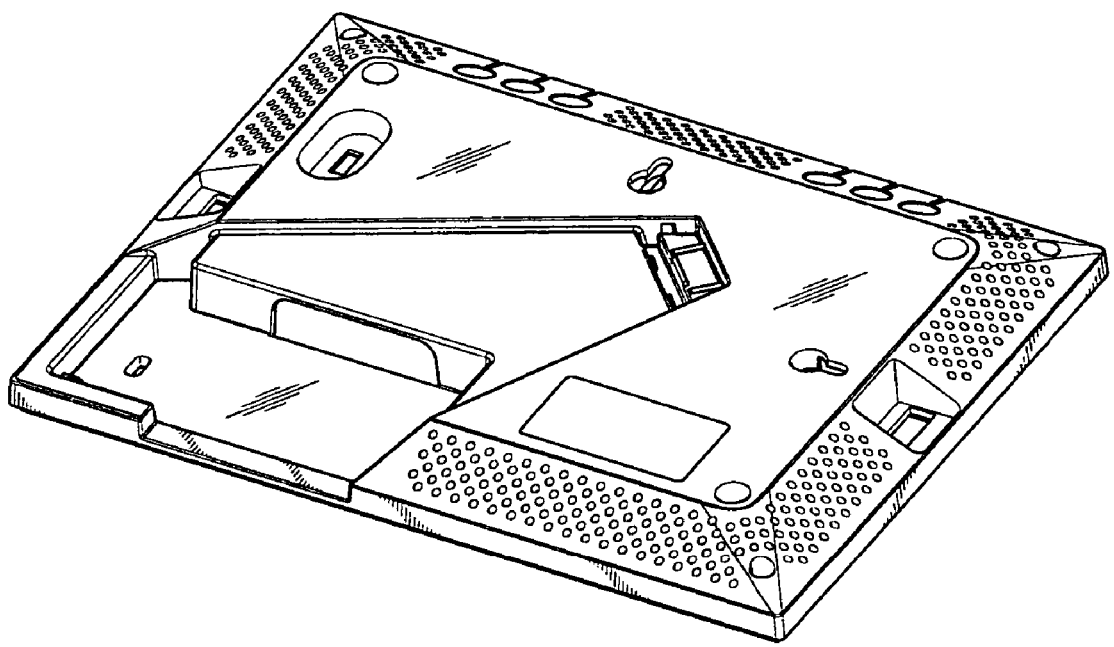
FIG. 6 is a perspective view of a molded article in which pinholes are densely arranged.
Figure 7:
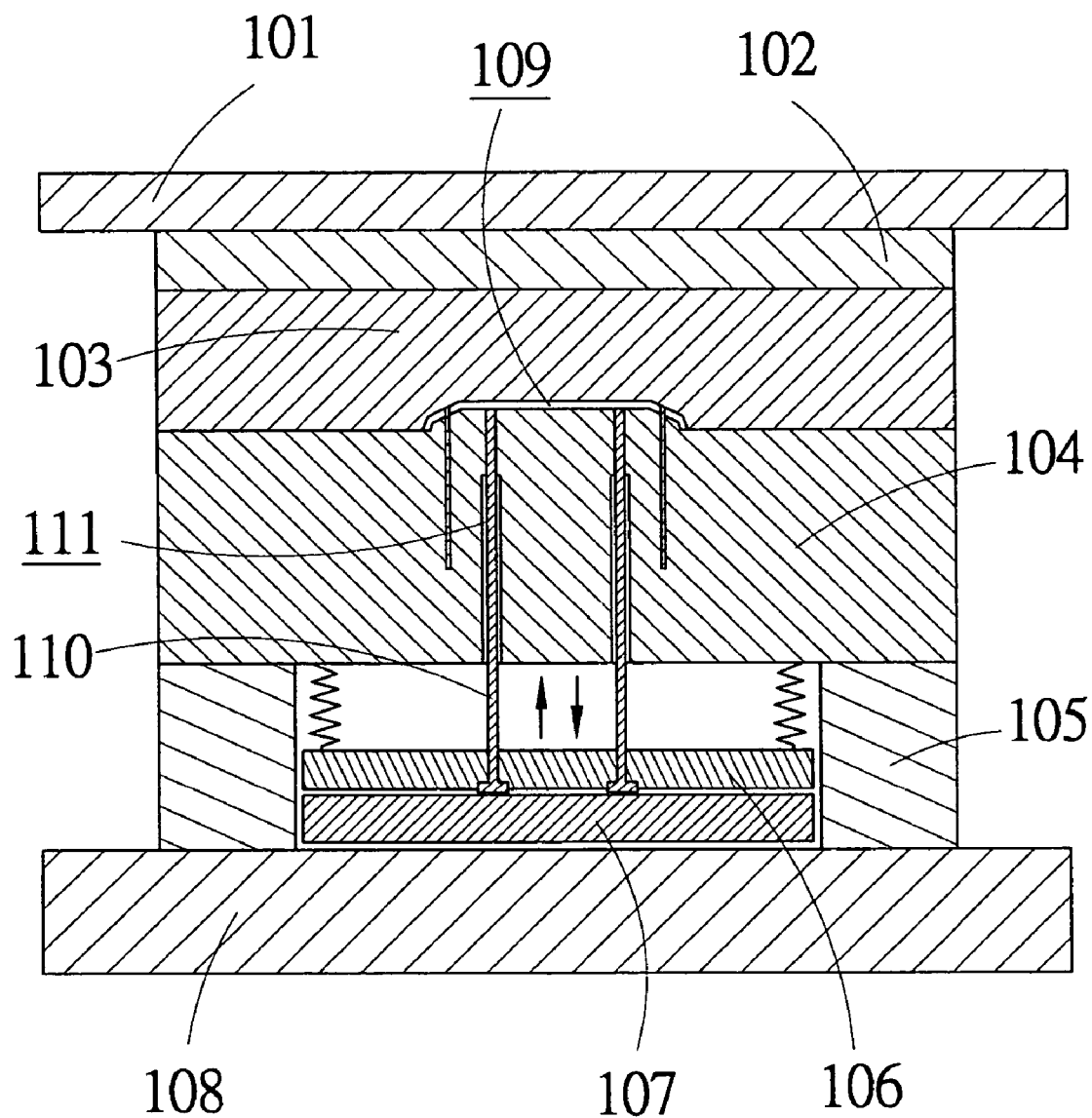
FIG. 7 is a schematic view of an injection mold and its ejecting mechanism in accordance with a prior art.

Further referring to FIGS. 4 and 5, the slider 223 is actuated to slide along the rail 222, which brings the guiding post 225 a displacement relative to the guiding groove 224, that is to say, the guiding post 225 comes from the higher end of the guiding groove 224 into the lower end. The guiding post 225 together with the movable board 226 and the pin cores 182 is therefore driven to move downward. The pin cores 182 are thus removed from the molded article by the accessorial ejecting mechanism.

From the above-mentioned, it can be seen that the pin cores 182 can be pre-removed from the molded article by the accessorial ejecting mechanism before the molded article is ejected from the male mold section 18 by the ejecting mechanism. Because pre-removing of the pin cores 182 from the molded article can largely reduce the friction of the following ejecting of the molded article, the molded article can be ejected swimmingly and smoothly to avoid being damaged.

While the present invention has been described with reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

What is claimed is:

1. An injection mold with accessorial ejecting mechanism adapted to form molded articles in which pinholes are densely arranged, comprising:

a female mold section;

a male mold section placed under the male mold section, the male and the female mold sections defining a mold cavity therebetween to form said molded article, the male mold section having a plurality of pin cores extending into the mold cavity to form said pinholes;

an accessorial ejecting mechanism comprising an accessorial plate mounted beneath the male mold section, the accessorial plate having a recess in the top surface thereof, at least a rail being received in the recess and fixed to the accessorial plate, at least a slider which is connected to a driving device being slidable along the rail, the slider defining at least a guiding groove whose opposite ends are in different height, a movable board to which said pin cores are fixed being also received in the recess, at least a guiding post being fixed to a side of the movable board and extending outwardly into the guiding groove; and an ejecting mechanism comprising at least an ejector plate and at least an ejector rod, one end of the ejector rod being secured to the ejector plate, the other end of the ejector rod meeting the mold cavity.

2. The injection mold with accessorial ejecting mechanism as claimed in claim 1, wherein the height difference between two opposite ends of the guiding groove at least equals the depth of said pinholes.

* * * * *